Feb. 12, 1929.
R. W. H. THOMAS
1,702,139
DEMOUNTABLE RIM AND TIRE LOCK
Filed June 1, 1927
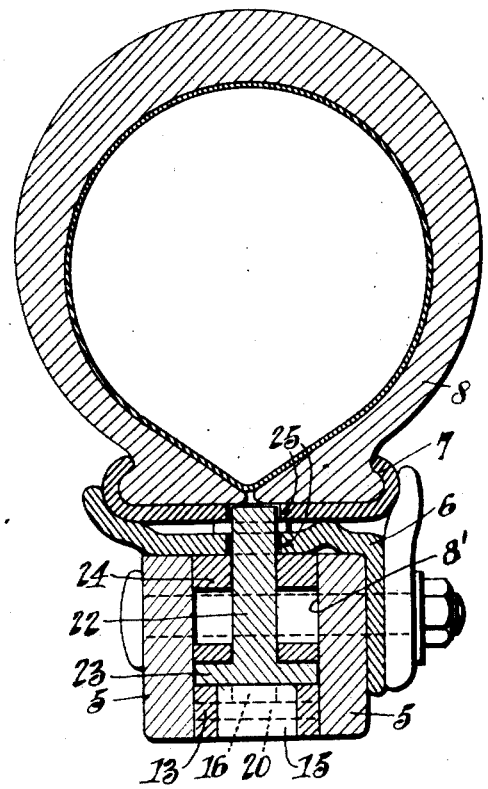
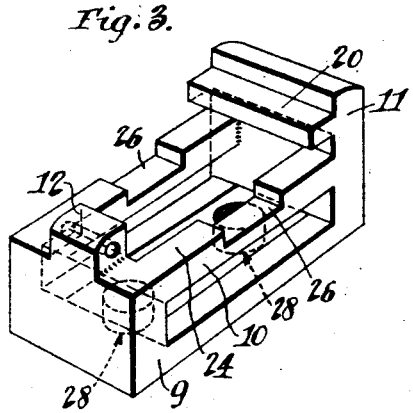
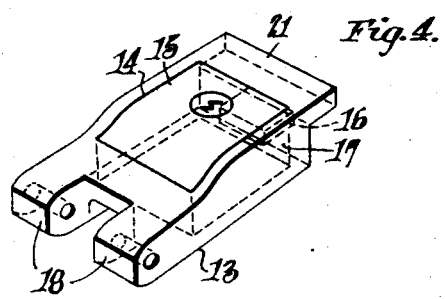
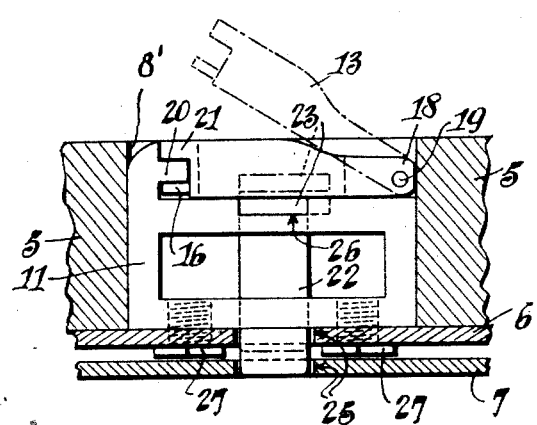
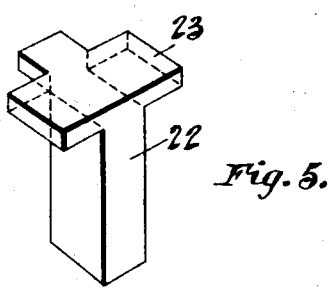
INVENTOR
Rogers W. H. Thomas.
BY
ATTORNEY Patented Feb. 12, 1929.

1,702,139

UNITED STATES PATENT OFFICE.

ROGERS W. H. THOMAS, OF ROSEVILLE, OHIO.

DEMOUNTABLE RIM AND TIRE LOCK.

Application filed June 1, 1927. Serial No. 195,775.

My invention relates to demountable rim and tire locks and its principal object is to provide a lock which will prevent an unauthorized person from removing the rim and tire from a vehicle wheel.

Another object of the invention is to provide a demountable rim and tire lock which will positively retain the latter on the wheel and which is so constructed as to render it applicable to all types of vehicle wheels and demountable rims, and when installed on the wheel occupies an out of the way position.

The invention also contemplates a lock of this character embodying a locking bolt for engagement with the rim and a relatively movable retaining element equipped with a conventional lock normally locked to the wheel in a position to prevent disengagement of the bolt keeper from the rim.

It is another object of the invention to provide a demountable rim and tire lock wherein the locking bolt is located in a position where one end will project beyond the periphery of the wheel felloe to interlock with the demountable rim and retain the wheel and rim against lateral separation or circumferential movement relative to each other.

With the preceding and other objects and advantages and the like the invention consists in the construction, arrangement of parts, and operations to be hereinafter specifically referred to and claimed and illustrated in the accompanying drawing, wherein, Figure 1 is a transverse sectional view of an automobile wheel demountable rim and tire having my improved lock applied thereto;

Figure 2 is a view partly in longitudinal section and partly in side elevation, the retaining member being shown in inoperative position in broken lines;

Figure 3 is a perspective of the body of the lock;

Figure 4 is a similar view of the bolt retaining element embodied in the invention, and Figure 5 is a perspective of the locking bolt.

Referring to the drawing in detail an automobile wheel felloe 5 equipped with a conventional felloe rim 6, and a demountable rim 7 carrying a pneumatic tire 8 is illustrated. A longitudinal opening 8' which opens upon the inner and outer faces of the felloe is provided to accommodate the device. My improved lock comprises a channel shaped metallic body 9 whose parallel legs are connected by spaced parallel bars 10 and having one of its parallel legs 11 of a greater height than the other. Formed centrally upon the upper face of the remaining parallel leg is a bored enlargement or extension 12 constituting a hinge knuckle joint.

Cooperating with the channel shaped body 9 is a relatively flat rectangular retaining member 13, the latter being provided with a recess 14 in one face in which a conventional lock 15 is retained and includes a locking bolt 16 movable through an opening 17 in the forward end of the retaining member in close proximity to the inner face thereof. Spaced parallel hinge knuckles 18 are formed upon the rear end of the member 13 which are disposed upon opposite sides of the hinge knuckle 12 and register therewith. A hinge pin 19 passes through these knuckles 13 and 18 to hingedly connect the member 13 to the body.

To retain the hinged retaining member in locked position a lateral projection or abutment 20 is formed upon and extends the entire length of the inner face of the leg 11 adjacent the outer edge of the latter. A forwardly projecting stop flange 21 is formed contiguous with the outer face of the member 13 at its free end which engages the lateral abutment 20 to limit the movement of the hinge member in one direction. As illustrated in Figure 2 the locking bolt 16 being disposed at the inner face of the member 13, underlies the stop 20 to prevent the retaining member 13 from being swung outwardly when the device is in locked position.

In order to lock the demountable rim 7 to the felloe 5 a locking bolt 22 is provided having a relatively flat T-shaped head 23 at its inner end. This locking bolt extends at right angles to the body 9 through a central rectangular opening 24 in the latter and engages registering openings 25 in the felloe rim and demountable rims respectively. Transverse aligned notches 26 are provided in the under faces of the bars 10 upon opposite sides of the opening 24 and normally receive the parallel legs of the head 23 while the intermediate leg of this head is confined between the opposed faces of the bars 10. With the T-shaped head thus arranged the locking bolt is held against lateral shifting in directions at right angles to each other and thus cause the bolt to properly line up with the openings 24 and 25.

As illustrated in Figure 2 the body 9 is placed within the longitudinal opening 8' with its base contacting with the felloe rim and is retained therein by threaded elements 27 passing through the felloe rim and engaging threaded openings 28 in the body 9.

In use the locking bolt is inserted longitudinally between the bars 9 and passed through the openings 24 engaging its outer end with openings in the felloe and demountable rims as illustrated in Figure 1. The retaining member 13 is then swung to a position parallel to the body 9 engaging the head 13 to retain the bolt against withdrawal and the lock 15 actuated to project its locking bolt beneath the abutment 20. When the occasion demands removal of the tire the member 13 is swung outwardly after the lock has been unlocked and the locking bolt withdrawn sufficiently to disengage from the openings 25.

What is claimed is:—

1. A demountable rim locking device comprising a body adapted to be mounted in a wheel felloe equipped with a demountable rim and having a transverse opening, a retaining member pivotally connected with one face of the body, a slidable latching bolt insertable through the transverse opening to engage the rim, and having a head engageable with the body to retain the locking bolt against movement in one direction, and means for locking the retaining member in a position to engage the head and retain the locking bolt against withdrawal in the opposite direction.

2. In a demountable rim locking device, a pair of pivotally connected members one of which has a transverse opening and adapted to be secured to a wheel felloe, a sliding latching bolt insertable through the opening with one end projecting beyond the felloe to engage a demountable rim embracing the latter, and having a head upon its inner end which is clamped between the two members when the latter are disposed in opposed relation, and means for locking the members together to prevent unauthorized withdrawal of the locking bolt.

3. A lock including a pair of members pivotally connected together and normally disposed in opposed relation, one of the members being adapted to be anchored to a support and having a transverse opening, and a slidable latching bolt insertable through the transverse opening and having a head engageable by the members when disposed in opposed relation, and locking means between the free ends of the members for retaining the latching bolt against unauthorized withdrawal.

4. In a lock, a body to be fixed to a support and having a central transverse opening, a lateral abutment flange projecting from one end of the body and overlying one face thereof, a sliding latching bolt insertable through the body to engage an object adjacent the support, a retaining member hinged to the opposite end of the body and adapted to be arranged in opposed relation to the body to cooperate with the latter in retaining the latching bolt against endwise movement, and a lock carried by the hinged member having its locking bolt shiftable from the free end of the latter and engageable beneath the abutment flange.

5. A lock of the character described comprising a rectangular body to be retained within an opening in a wheel felloe, a latching bolt slidable through the body at right angles thereto for engagement with a demountable rim, a hinged retaining member carried by the body and arranged to extend at right angles to the locking bolt to engage the latter and retain it in operative position, coacting abutments between the free end of the retaining member and body to limit the movement of the body in one direction, and a lock carried by the retaining member to engage one of the abutments to lock the retaining member against movement in the opposite direction.

6. A lock of the character described comprising a body adapted to be mounted in a wheel felloe and having a central opening, a locking bolt insertable through the central opening, a head formed on one end thereof, means engaging the head to retain the bolt against lateral shifting, and a retaining member associated with the body and normally locked in a position to engage the head and retain the bolt in a position where one end projects beyond the body.

ROGERS W. H. THOMAS.